Mar. 13, 1923.
E. P. KENDALL
PLANTER
Filed Mar. 6, 1919
1,448,303
2 sheets-sheet 2
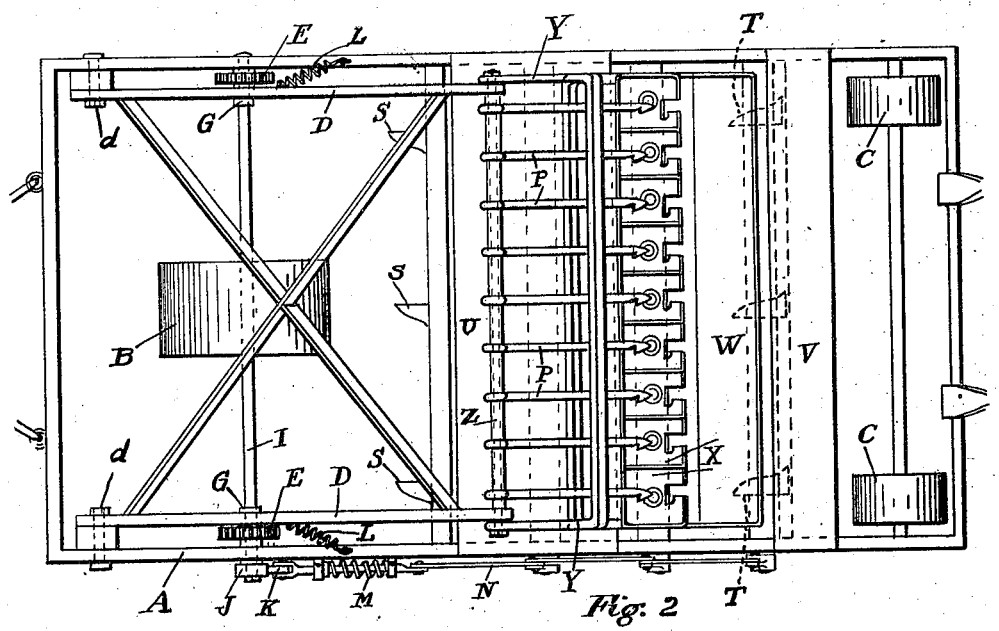
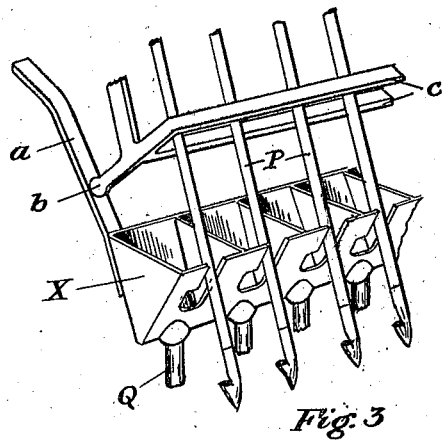
Fig. 3
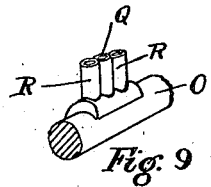
Fig. 9
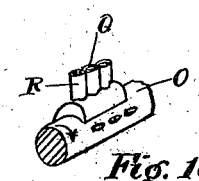
Fig. 10
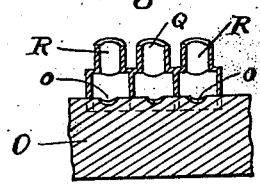
Fig. 11
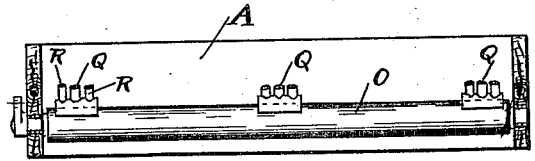
Fig. 8
Inventor.
Edward P. Kendall
By Ellis Spear
Attorney Patented Mar. 13, 1923.

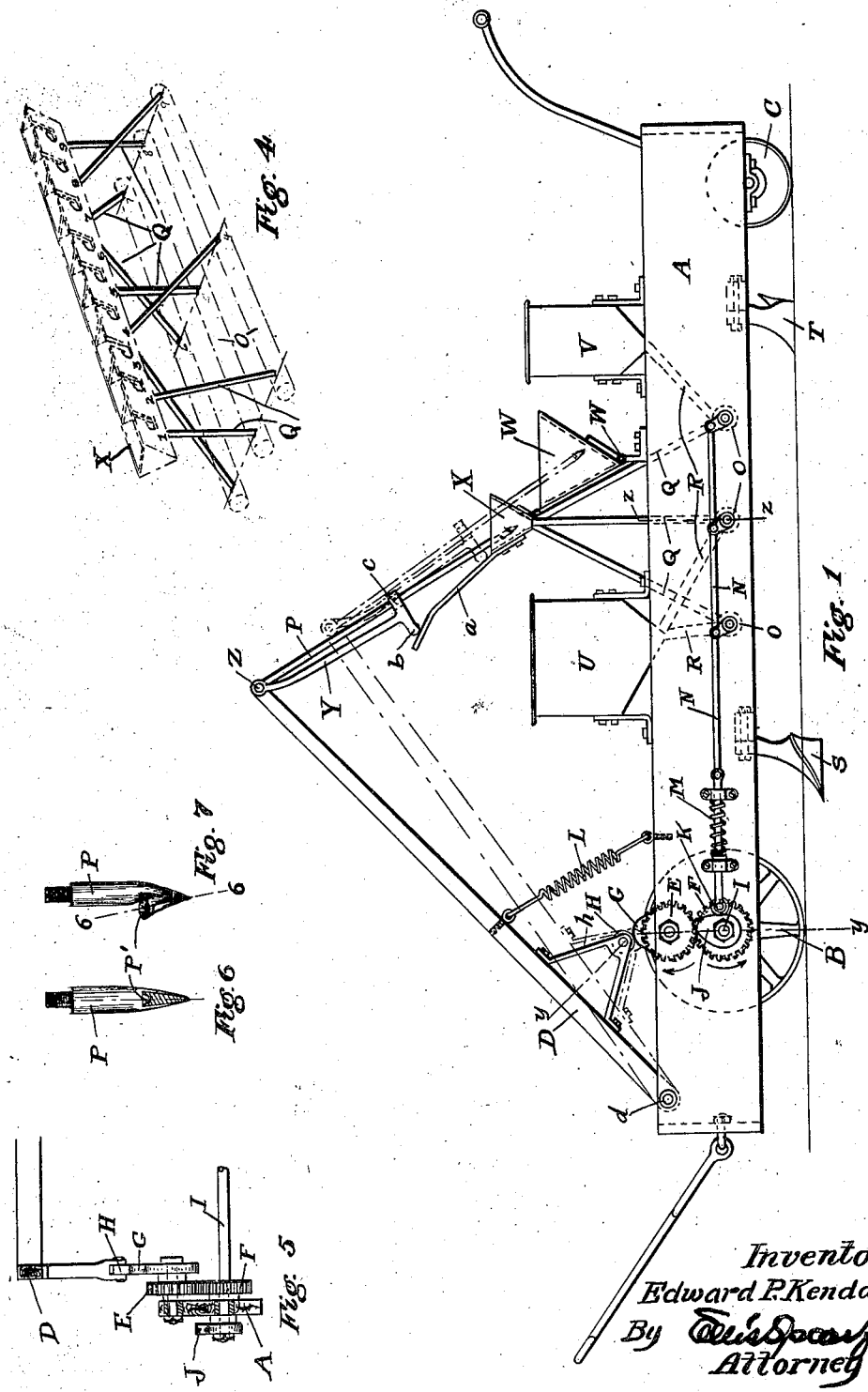

1,448,303

UNITED STATES PATENT OFFICE.

EDWARD P. KENDALL, OF BOWDOINHAM, MAINE.

PLANTER.

Application filed March 6, 1919. Serial No. 280,986.

*To all whom it may concern:*

Be it known that I, EDWARD P. KENDALL, a citizen of the United States, residing at Bowdoinham, county of Sagadahoc, State of Maine, have invented certain new and useful Improvements in Planters, of which the following is a specification.

This invention relates to planters.

In planting such vegetables as beets, turnips and other vegetables where the seeds are small, it has usually been found necessary to overplant and thin out on account of the inability to accurately and consistently drop the small seeds.

Overplanting is of course undesirable as wasteful of seed and fertilizer, involves the needless labor of thinning out and retards the growth of the crop on account of the crowding of the young plants and the struggle for and the exhaustion of the local nourishment of the soil.

To the end therefore of providing a planter in which an accurate dropping of even small seeds is possible, I have devised my present invention. In the accompanying drawings I have shown an embodiment which I have found well adapted to practical use and which is simple and inexpensive and thus available even for smaller farms.

Throughout the specification and drawings like reference characters are employed to indicate corresponding parts. In these drawings:

Fig. 1 is a side elevation of a planter in accordance with my invention.

Fig. 2 is a plan view of the same.

Fig. 3 is a detail of the seed feeders.

Fig. 4 is a diagrammatic indication of the seed distribution.

Fig. 5 a detail of the operating mechanism.

Figs. 6 and 7 are views of the seed needles.

Fig. 8 is a view through the dropping bar, and

Figs. 9, 10 and 11 are further details of said bar.

My machine consists of a light frame A supported on a pair of rear wheels C and having a central front drive wheel B. The drive wheel B is fast on a shaft I on the ends of which are gears F—F. Above each end of the shaft I meshing with the gears F—F I mount the frame gears E—E each of which carries a cam G—G.

These cams bear against a roller H on a bracket $h$ bolted to the levers D. There are two of the levers D each pivoted at one side of the machine as shown at $d$ and normally held down by springs L attached to the side frames A. The levers D are connected at their upper end by a cross bar Z to which are hooked a plurality of seed needles P. These needles are guided in a frame Y also pivoted to the cross rods Z.

Each needle P has a point preferably detachable. Each point is hooked and pocketed as indicated at $P^1$. These points are provided with pockets of different size each adapted to receive a single seed of the desired size. If desired the points may be made with double or triple pockets.

The frame Y bears at $b$ on a cam piece $a$ which is so shaped as to lift the frame Y and with it the needles P on the down stroke of the needles so as to clear the seed distributing receivers which are slotted to permit the passage of the needles.

Just below the hopper series is the seed trough W which extends across the machine, being preferably hinged at $w$ so as to have a slight rocking motion. The hopper W is slightly off balance so as to tend by gravity to stand forward. It has a very slight potential rock backwards effected simply by the dip of the needles into the seeds and this rocking is just sufficient to shake down the seeds and fill the depressions made by the dip of the needle point in the body of the seeds as they lie in the trough.

Extending from each of the funnel distributers X are tubes Q which lead to a foot bearing on a rocker bar O. The rocker bar O is pocketed at $o$. These pockets are preferably arranged in groups of three, there being three of such groups spaced across the three bars. One of the said tubes Q leads to the central pocket $o$ of each one of these groups. The pockets and bars are so disposed as to provide for nine equally spaced dropping points covering a rectangular area which for the purposes of illustration we will say is sixteen inches square. This would provide the planting of seeds eight inches apart.

I also provide fertilizer hoppers U and V. These are arranged conveniently adjacent to the transverse rocker bars O and have feed tubes R running in pairs to the common foot so as to cover the pockets $o$ on each side of the central seed pocket of the group.

The rocker bars O are each provided at one end with a short crank arm connecting with a slide rod N. The rod N is normally held forward by the spring M so that its roller K bears against the cam J on the drive shaft I. There is a gear F on each end of the shaft I which meshes with the gear E to which the cam G before described is fixed.

On the cross frames of the machine are arranged three furrowing plows S and three covering plows T. The cam J of the machine is so timed that it will drop the nine seeds, advance the proper distance, which in the instance above explained would be twenty-seven inches, and again drop nine seeds.

The seeds whether dropped singly or in pairs or triplets may be accurately placed, each being dropped with a small pinch of fertilizer on each side and being immediately covered by the following plows or scrapers. The wheels C may also be made to track the covering plows if desired and roll the lightly covered furrow.

The machine as described is extremely simple and free from tendency to get out of order. It may be built as a light hand propelled planter or if desired may be made to be drawn.

Various modifications may obviously be made in the form, arrangement, size, number and parts, and the design and material of the machine, all without departing from the spirit of my invention if within the limits of the appended claims.

What I therefore claim and desire to secure by Letters Patent is:—

1. In a seed planter, a seed supply hopper and a seed distributing hopper, a reciprocable transfer needle operative to transfer material from said supply to said distributing hopper, a distributer conduit leading from said distributing hopper, a rocking valve having a pocket normally disposed to receive the material discharging from said conduit, and means for intermittently rocking said valve to empty the material introduced within said pocket.

2. In a seed planter, a seed supply hopper and a seed distributing hopper, reciprocable transfer needles operative to transfer material from said supply to said distributing hopper, rocker rods having pockets disposed to be uncovered when the rods are rocked, distributer conduits leading from said distributing hopper to said pockets, and a common operating mechanism for simultaneously rocking all of the rods to empty the material introduced with said pockets.

3. In a seed planter, a seed supply hopper and a seed distributing hopper, a reciprocable transfer needle operative to transfer material from said supply to said distributing hopper, a rocker rod having a pocket disposed to be uncovered when the rod is rocked, a distributer tube leading from said pocket and having a footed bearing on said rod, and means for intermittently rocking said rod to empty the material introduced within said pocket.

4. In a seed planter, a seed supply hopper and a seed distributing hopper, a transfer device operative to transfer seed from said supply to said distributing hopper, a fertilizer hopper, a conduit leading from said seed delivering hopper and a conduit leading from said fertilizer hopper, and a rocking valve common to both of said conduits and having pockets into which the conduits normally discharge, and means for intermittently rocking said valve to empty the material introduced within said pockets.

5. In a seed planter, a seed supply hopper and a seed distributing hopper, a transfer device operative to transfer seed from said supply to said distributing hopper, a fertilizer hopper, a conduit leading from said seed delivering hopper and a conduit leading from said fertilizer hopper, a rocker rod common to both of said conduits and having pockets into which the conduits normally discharge, and means for rocking the rod to empty the materials introduced within said pockets.

6. In a seed planter, a seed supply hopper and a seed distributing hopper, a reciprocating transfer needle guided past said distributing hopper and into said supply hopper, means for dropping the end of the needle onto said distributing hopper to dislodge the material therefrom, a conduit leading from said distributing hopper, and a valve controlling the discharge of the material from said conduit.

7. In a seed planter, a seed supply hopper, and a seed distributing hopper, a transfer needle reciprocating between said hoppers, and a cam disposed to lift the needle in one direction of movement thereof whereby to clear the needle of the distributing hopper.

8. In a seed planter, a seed supply hopper and a seed distributing hopper, a transfer needle reciprocating between said hoppers, a reciprocating guide for said needle, and a cam disposed to lift the needle guide in one direction of movement thereof whereby to clear the needle of the distributing hopper.

9. In a seed planter, a frame, a seed supply hopper and a seed distributing hopper mounted thereon, a transfer needle reciprocating past said distributing hopper and into said supply hopper, a cam disposed to lift the needle in one direction of movement thereof whereby to clear the needle of the distributing hopper, and mechanism for reciprocating the needle comprising a lever, a cam for rocking said lever, and a crossbar connected to said lever and to said needle.

10. In a seed planter, a frame, a seed supply hopper and a seed distributer hopper mounted thereon, transfer needles reciprocating past said distributer hopper and into said supply hopper, a reciprocating guide for said needles, a cam disposed to lift the needle guide in one direction of movement thereof whereby to clear the needles of the distributer hopper, and mechanism for reciprocating the needles comprising a pair of levers, a cam for rocking said levers, and a cross-bar connected to said levers and to said needles and needle guide.

In testimony whereof I affix my signature in presence of two witnesses.

EDWARD P. KENDALL.

Witnesses:
VICTORIA LOWDEN,
MARION F. WEISS.